Nov. 6, 1962           C. E. CHESSER           3,062,261
TOOL FOR ASSEMBLING PLATES IN FLATWISE ENGAGEMENT
AND METHOD OF ASSEMBLING PLATES
Original Filed Jan. 28, 1954           7 Sheets-Sheet 1

Inventor:
Cecil E Chesser
By Frank H. Marbs
Nathan R. Kraus,
Att'ys

Nov. 6, 1962 C. E. CHESSER 3,062,261
TOOL FOR ASSEMBLING PLATES IN FLATWISE ENGAGEMENT
AND METHOD OF ASSEMBLING PLATES
Original Filed Jan. 28, 1954 7 Sheets-Sheet 3

Inventor:
Cecil E. Chesser
By Frank H. Marks
Nathan N. Kraus,
Att'ys

United States Patent Office 3,062,261
Patented Nov. 6, 1962

3,062,261
TOOL FOR ASSEMBLING PLATES IN FLATWISE ENGAGEMENT AND METHOD OF ASSEMBLING PLATES
Cecil E. Chesser, Hebron, Ohio, assignor to Sears, Roebuck and Co., Chicago, Ill., a corporation of New York
Original application Jan. 28, 1954, Ser. No. 406,769. Divided and this application Sept. 12, 1958, Ser. No. 760,622
15 Claims. (Cl. 153—2)

This application is a division of my pending application, Serial No. 406,769, filed January 28, 1954 and now abandoned.

This invention relates to the connection of sheet metal plates in flatwise interengagement with each other and is especially useful in the manufacture of cooking ranges and various other cabinets embodying sheet metal parts.

A particular object is to provide a tool for securing a pair of plates in firm flatwise interengagement.

Various other objects will become apparent as the description proceeds.

Referring now to the drawings forming a pair of this application.

Figure 1:
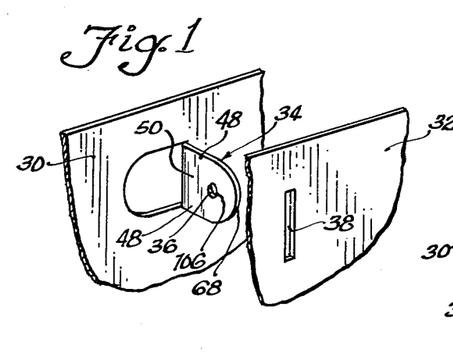
FIG. 1 is a fragmentary perspective view of a pair of plates about to be preliminarily assembled preparatory to their securement together.

Referring now more particularly to the drawings, illustrating various embodiments of the invention, there is shown in FIG. 1 a pair of plates 30 and 32 adapted to be interlocked in flatwise interengagement by various tools embodying features of the invention to produce a variety of connections by various methods embodying features of the invention.

Figure 2:
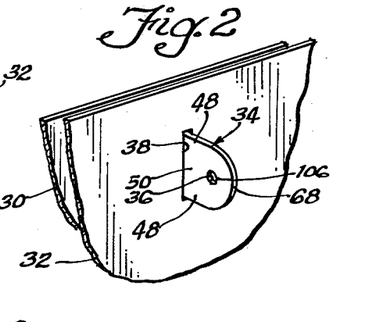
FIG. 2 is a view similar to FIG. 1 but with the plates preliminarily assembled.
Figures 3, 4:
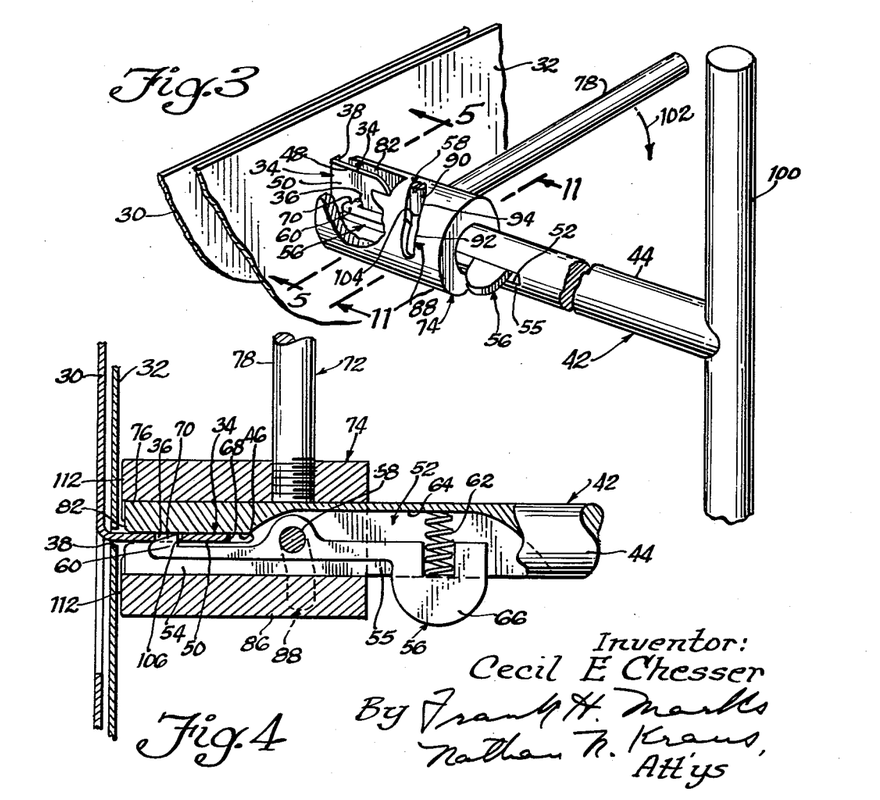
FIG. 3 is a view similar to FIG. 2 but includes a hand operated tool, with parts broken away mounted in position for commencement of the operation by which the plates are to be securely fastened together in tight, flatwise interengagement.
FIG. 4 is a horizontal sectional view, partly in section and partly in elevation, of the tool and plates shown in FIG. 3.

A tongue 34, having a hole 36, and extending at a right angle to the remainder of the plate 30, is struck therefrom. The plate 32 has a slot 38 adapted to readily and freely receive the tongue 34. The plates 30 and 32 are preliminarily assembled as shown in FIG. 2 for assembly with a hand-operated tongue-deforming tool 42 in accordance with the form of the invention shown in FIGS. 3 to 11 and 13. The tool 42 comprises a rod or shaft 44 having a longitudinal diametral end kerf 46 of a width such as to slidably and fairly snugly receive the tongue 34, the diameter of the rod being substantially less than the width of the tongue so that, when the rod is slipped over the tongue with the rod and tongue coaxial, the side margins 48 of the tongue extend substantially beyond the sides of the rod, and the intermediate portion 50 of the tongue is located in the kerf as shown in FIGS. 3 et seq. The rod 44 has an additional and wider and longer longitudinal slot 52 at right angles to the kerf 46, the outer end portion 54 of the slot terminating at the center of one side of the kerf and the inner portion 55 of the slot being substantially deeper than said outer slot end portion.

A pawl or lever 56 is fulcrumed to a pin 58 fixed to the rod 44 and has at its outer end a ratchet type detent 60 urged toward the kerf 46 by a spring 62 held under compression between the bottom 64 of the inner slot portion 55 and the inner arm 66 of the pawl.

With the plates 30 and 32 preliminarily assembled as shown in FIGS. 2, 3 and 4, it is apparent that as the tongue 34 is slipped into the kerf 46, the tongue end 68 will engage the inclined edge 70 of the detent 60 and cam it aside against the resistance of the spring 62, and, upon substantial completion of entry of the tongue, the detent will snap into the tongue hole 36 so that the parts will be assembled to the extent shown in FIGS. 3 and 4.

Figure 5:
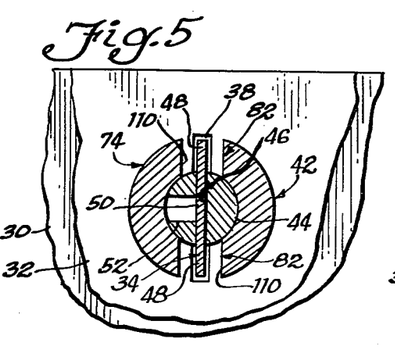
FIG. 5 is a sectional view taken as indicated by the line 5—5 in FIG. 3.

A lever 72 is attached at one end as by threaded engagement (FIG. 4) to a sleeve 74 telescoped about the outer end portion 76 of the rod 44 and has a handle 78 for rotating the same and diametrically opposite radial slots 82 in said sleeve 74 (FIGS. 5, 8 and 10) which are of substantially the same length as, but wider than, the rod kerf 46 and substantially centrally receive the marginal portions 48 of the tongue 34 when the intermediate portion 50 of the tongue is received in the kerf as shown in FIG. 5. The inner portion 86 of the sleeve 74 has a slot 88 into which projects an end 90 of the fulcrum pin 58. The slot 88 has a portion 92 which extends normal to the axis of the sleeve 74 and a second portion 94 which is a part of a helix inclined to said axis (FIG. 7).

Figure 6:
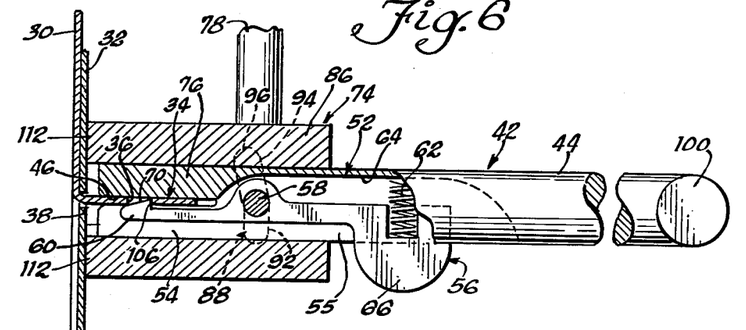
FIG. 6 is a view similar to FIG. 4 but with the tool in an adjustment at which the plates have been drawn together in tight, flatwise interengagement.
Figures 7, 11:
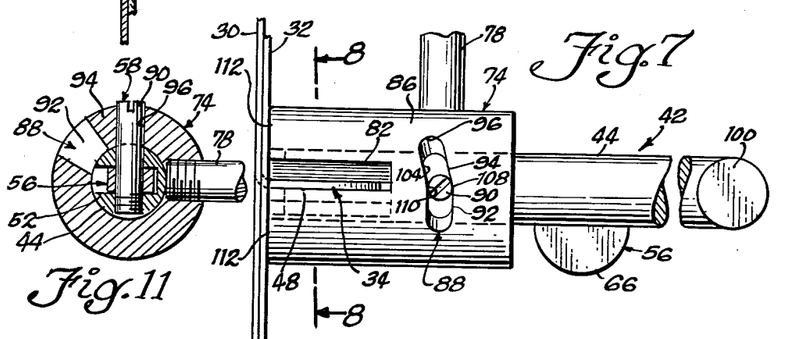
FIG. 7 is an axial plan view of the tool and edge view of the plates in the adjustment shown in FIG. 6.
FIG. 11 is sectional view taken as indicated by the line 11—11 in FIG. 3.
Figure 8:
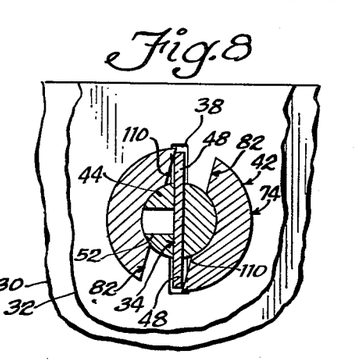
FIG. 8 is a sectional view taken as indicated by the line 8—8 in FIG. 7, similar to FIG. 5 but at a later stage of the operation.

When the tool 42 is first applied to the plates 30 and 32 as shown in FIGS. 3 and 4, the fulcrum pin end 90 is disposed at the closed end 96 of the helical slot portion 94, as shown in FIGS. 3 and 11. Fixed to the shaft 44 is a handle 100. While the operator holds the handle 100 fixed in one hand, the tongue 34 assembled with the tool as shown in FIGS. 3 and 4, the operator rotates the lever handle 78 clockwise as indicated by the arrow 102 in FIG. 3, with the result that the inner wall 104 of the helical cam slot portion 94, by virtue of engagement of said wall with the pin end 90, is cammed by the pin end, and thus the sleeve 74 shifts relative to the rod 44 toward the plate 32, the pitch of the helical slot portion being such as to effect sufficient relative movement to enable the sleeve to force the plate 32 into tight flatwise engagement with the plate 30, as shown in FIGS. 6 and 7, with the detent 60 in engagement with the portion 106 of the tongue hole 36. At the completion of this relative movement, the pin end 90 is at the entrance 108 of the slot portion 92, as better shown in FIG. 7, and the walls 110 of the slots 82 have just come into engagement with the marginal portions 48 of the tongue 34, as shown in FIG. 8.

Figure 9:
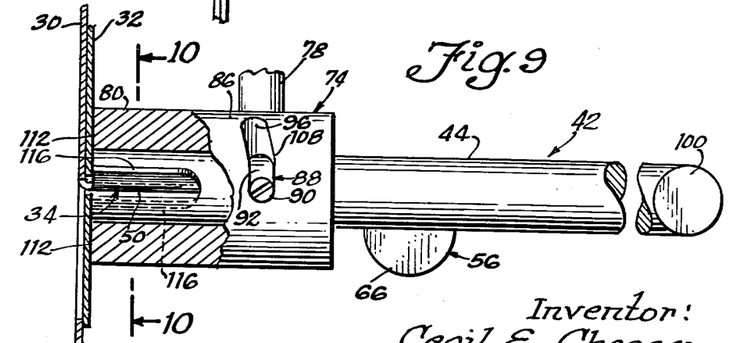
FIG. 9 is a view similar to FIG. 7 but is partly in section and partly in elevation, with parts broken away and with the tool in its final adjustment, showing the plates interlocked in final condition.
Figure 10:
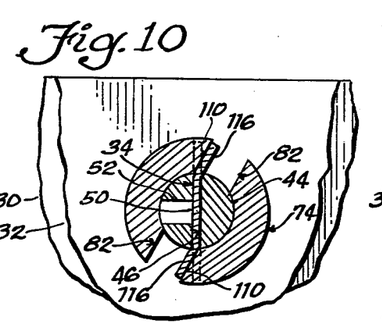
FIG. 10 is a sectional view taken as indicated by the line 10—10 in FIG. 9, similar to FIGS. 5 and 8 but at a still later stage.
Figure 12:
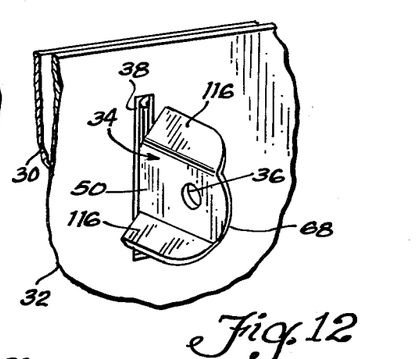
FIG. 12 is a perspective view showing the plates finally interlocked.
Figure 13:
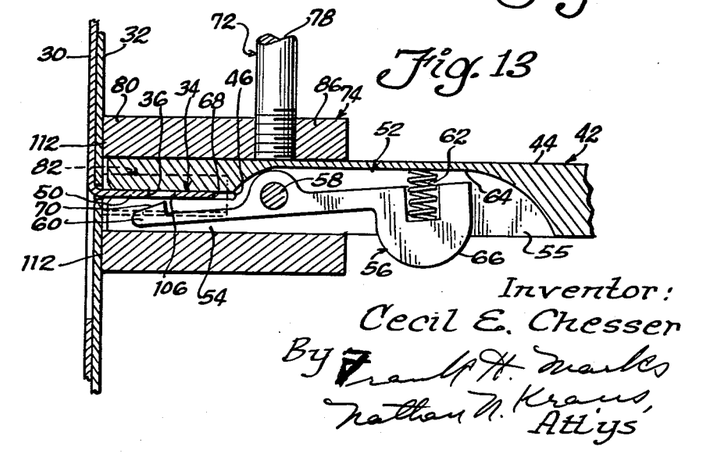
FIG. 13 is a view similar to FIGS. 4 and 6 but taken at the completion of the operation of the tool and with the tool released, preparatory to its removal.

Now the sleeve handle 78 is further rotated and, throughout such rotation, the pin end 90 is locked in the sleeve slot portion 92, with the result that there is no relative axial movement between the sleeve 74 and the rod 44, but there is relative rotation therebetween, the coplanar end faces 112 of the sleeve sliding against the plate 32. The intersection of the sleeve slot walls 110 with the sleeve end faces 114 is sharp so that the sleeve thereat constitutes a pair of shear members which shear the marginal portions 48 of the tongue 34 in a clockwise direction to form tabs 116 on the opposite sides of the longitudinal median of the tongue 34 (FIGS. 9, 10 and 12). The tabs 116 tightly engage the plate 32 and thus afford a fixed coupling between the plates 30 and 32 without the use of additional fastening means.

To release the tool 42 from the plates 30 and 32, it is necessary merely to depress the end 66 of the pawl 56 against the resistance of the spring 62, thereby withdrawing the detent 60 from the tool hole 36, whereupon the tool may be freely withdrawn, leaving the assembled plates as shown in FIG. 12.

Figures 14, 17:
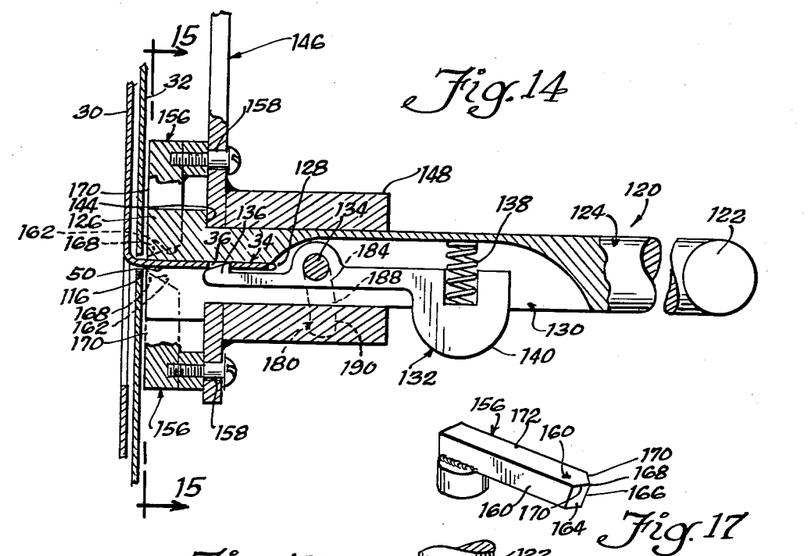
FIG. 14 is a view similar to FIG. 4 but shows a modified hand tool.
FIG. 17 is a perspective view of a deforming element of the tool of FIGS. 14 to 16.
Figures 15, 16, 18, 19:
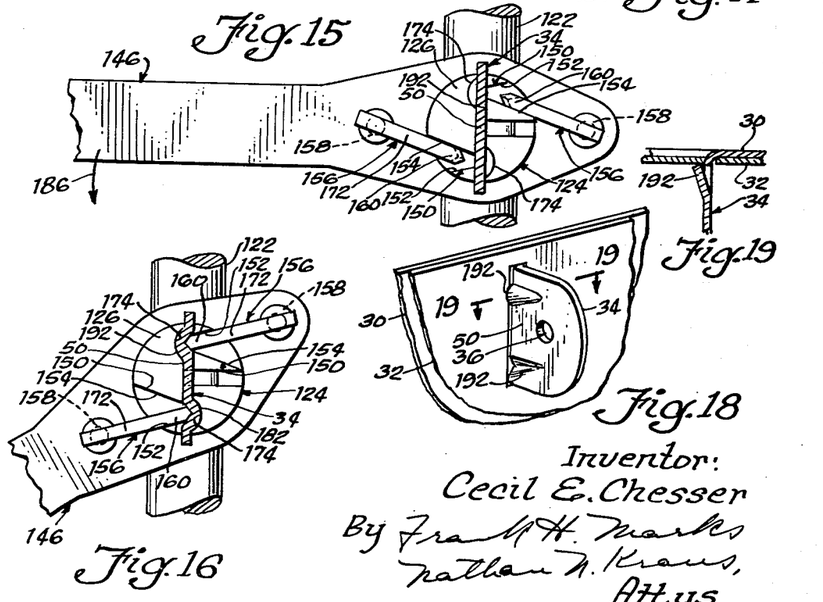
FIG. 15 is a sectional view taken as indicated by the line 15—15 in FIG. 14 and turned 90°.
FIG. 16 is a view similar to FIG. 15 but shows the tool in its final adjustment, in which the plates have been securely locked together in flatwise interengagement.
FIG. 18 shows the plates fastened together by the tool of FIGS. 14 to 17.
FIG. 19 is a sectional view taken as indicated by the line 19—19 in FIG. 18.

Another plate assembly and hand tool 120 for effecting the same are disclosed in FIGS. 14 and 19. In this form, the same plates 30 and 32 may be used and preliminarily assembled as above. The tool 120 comprises a handle 122 from which extends a rod or shaft 124 having in its free end 126 a longitudinal diametral kerf 128 in which the intermediate portion 50 of the tongue 34 is adapted to pass as the tool is preliminarily assembled with the plates as shown in FIG. 14. The tool rod 124 has a radial slot 130 normal to the kerf 128 and extending from the rod end 126 to a point substantially beyond and communicating with the kerf, and a pawl or lever 132 is fulcrumed in the slot by a pin 134. The inner end 136 of the pawl 132 is formed as a ratchet detent which is cammed aside as the tongue end 68 passes into the kerf 128 against the resistance of a spring 138 confined between the bottom of the slot 130 and the inner end 140 of the pawl, said spring operating to snap the detent into the tongue hole 36 to retain the plates 30 and 32 in preliminary assembly with the tool as shown in FIG. 14.

The free end 126 of the rod 124 has a head 144 adapted to slidably abut the inner end of a lever 146 having a sleeve 148 telescoped about the rod. The rod head 126 is substantially V-notched as indicated at 150, affording inwardly converging walls 152 and 154 terminating inwardly at the rod end kerf 128. Hardened deforming elements 156 made of steel or other suitable material are provided, each pivoted at one end as indicated at 158 to the handle 146 on parallel axes at diametrically opposite sides of and spaced from the rod head 144, the free end portions 160 of said elements projecting in the notches 150. The end portion 160 of each element 156 terminates in a nose having angularly related faces 164 tapering to an inclined juncture line 166, the end 168 of said line being farthest from the handle 146, and the juncture lines 170 between said faces and the outer surfaces 172 of the element being sharp and defining metal-shearing edges. The rod head 144 is formed with part-conical pockets 174 communicating with the kerf 128, the wide ends of the pockets being coterminous with the rod 124, the walls 152 and 154 of the V-notches 150 converging toward said pockets.

The lever sleeve 148 has a slot 180 into which projects an end (not shown) of the fulcrum pin 134, said end being disposed at the closed end of the inclined portion 184 of the slot when the parts are preliminarily assembled as shown in FIGS. 14 and 15, preparatory to the tongue-deforming operation. As the lever 146 is rotated by one hand of the operator in the direction indicated by the arrow 186 (FIG. 15) while the other hand of the operator holds the rod handle 122, the pin end rides in the inclined portion 184 of the slot 180 and reaches the open end 188 of said slot portion when the plates 30 and 32 are in tight, flat-wise interengagement and the surfaces 172 of the deforming elements 156 are in tight but slidable engagement with the plate 32. As the rotation of the lever 146 is continued, the pin end rides in the slot portion 190 whose walls are normal to the axis of the rod 124, with the result that the deforming elements 156, guided by the walls of the notches 150, move toward the opposite faces of the tongue 34 and ultimately depress portions of the tongue into the recesses 174 of the enlarged rod head portion 126, thus shearing the tongue portions engaged thereby to produce oppositely offset tongs 192 which take the part-conical form of the recesses, the sheared edges of the tongs engaging the inner surface of the plate 32 to securely fasten the plates 30 and 32 in fixed relation as shown in FIGS. 18 and 19. The elements 156 during the deforming movement thereof pivot at 158 relative to the lever 146.

Upon completion of the deforming operation, the operator depresses the end 140 of the pawl 132 sufficiently to withdraw the detent 136 from the tongue hole 36, and then pulls the tool 120 free of the plates 30 and 32, leaving the plates securely assembled as shown in FIGS. 18 and 19.

Another form of locked plate assembly and an automatic tool 200 for effecting that assembly is disclosed in FIGS. 20 to 24. The tool 200 comprises a cylinder 202 in which is disposed a piston 204 having a depending sleeve 206 which telescopically receives a guide rod 208 fixed as at 210 at its lower end to the bottom 212 of a casing member 214 secured to the bottom 215 of the cylinder. The casing 214 has a lower side alcove 216 in which is secured a stationary die block or anvil 218 having a part-cylindrical bearing recess 220 in which the part-cylindrical projection 222 of a movable bending and shearing die jaw 224 engages. The bending jaw 224 at the side opposite the rounded projection 222 thereof has upper and lower surfaces 226 and 228 obtusely inclined to each other with a preferably filleted juncture. The die jaw 224 is actuated by a plunger 230 having an upper laterally offset head 232 formed with an arcuate surface 234 in sliding engagement with the outer surface of the piston sleeve 206, said plunger being movable in one direction or the other according as said head is moved by the piston 204 or by the bottom flange 238 of the sleeve 206 as will appear. The plunger head 232 is adapted to fit slidably in the depending cylindrical skirt 242 of the piston 204. The plunger 230 has a lower inner surface 246 which is at all times in sliding engagement with the inner surface 248 of the alcove wall 250, and has a rounded bottom nose 252 bearing against the adjacent side of the die jaw 224.

Figures 20, 23, 24:
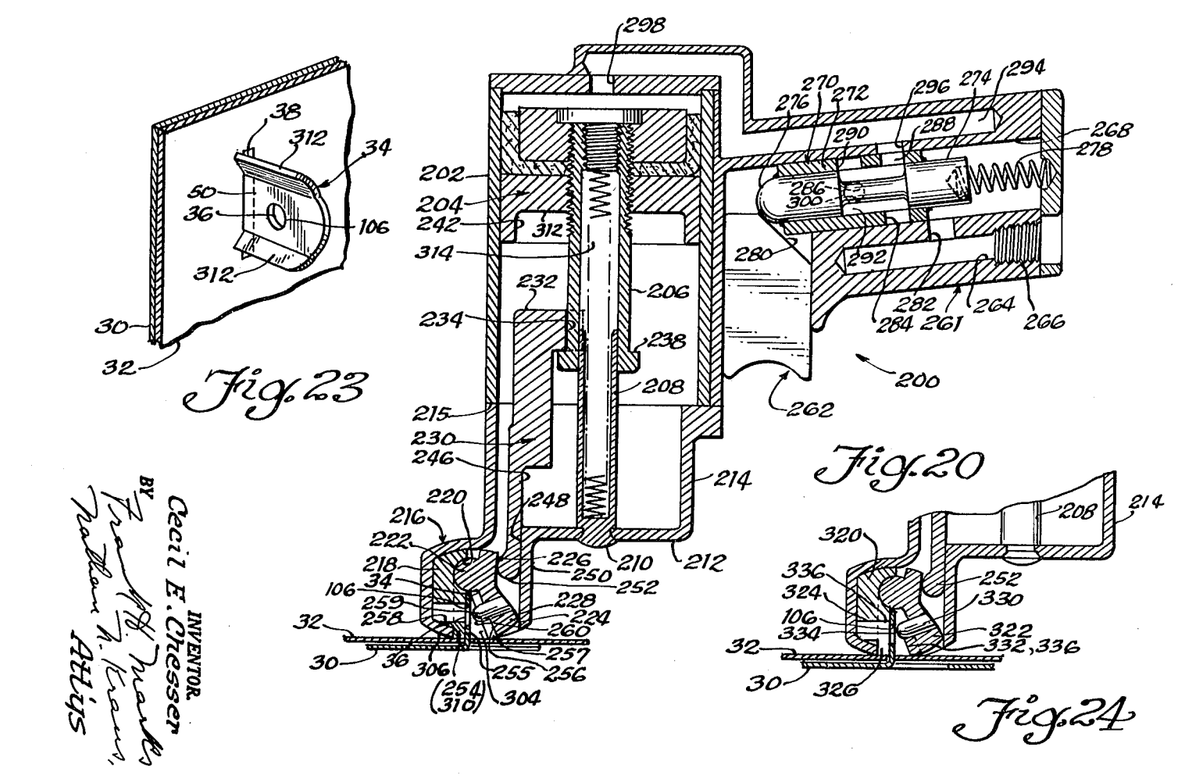
FIG. 20 is a sectional view of a hand-controlled fluid-operated tool for uniting a pair of plates in accordance with my invention, with the deforming portions of the tool in position preparatory to the deforming operation, and with a pair of plates assembled therewith.
FIG. 23 is a perspective view of the plates locked together by the tool of FIG. 21.
FIG. 24 shows a portion of the tool of FIG. 20 with modified deforming elements, preparatory to the deforming operation and a pair of plates assembled therewith.
Figures 21, 22, 25, 26, 27:
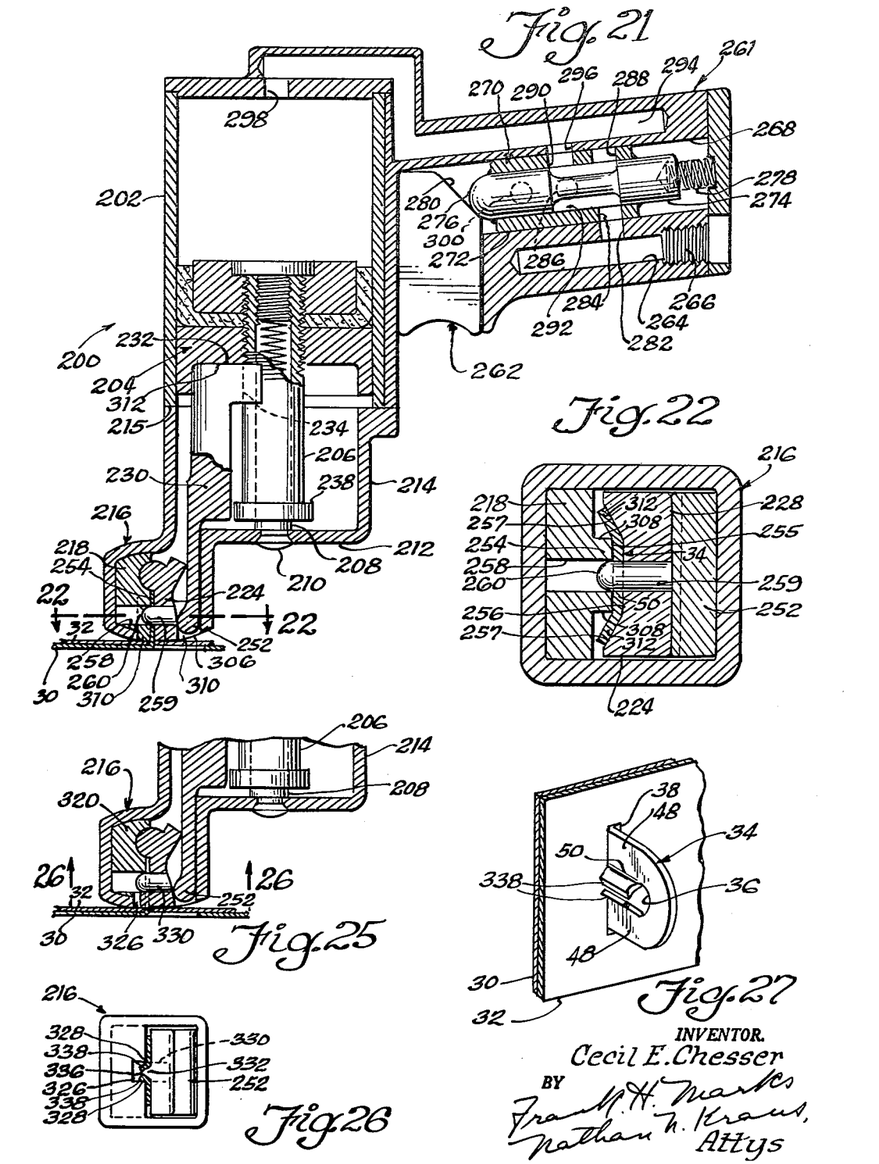
FIG. 21 is a view similar to FIG. 20 but with the deforming elements of the tool in final position, at the completion of the deforming operation, with the plates locked together.
FIG. 22 is a sectional view taken as indicated by the line 22—22 in FIG. 21.
FIG. 25 is a view similar to FIG. 24 but with the deforming elements in final position, at the completion of the deforming operation, with the plates locked together.
FIG. 26 is a sectional view taken as indicated by the line 26—26 in FIG. 25.
FIG. 27 is a perspective view of the plates locked together by the tool of FIG. 24.

The anvil 218 has an intermediate preferably hardened projection 254 below the rounded pocket 220 thereof, with a face 255 confronting the bending jaw 224, and the jaw has a central surface 256 complemental to the anvil face and inclined side surfaces 257, forming with the surface 256 a truncated V-groove, said side surfaces being adapted, as will appear, to occupy positions straddling the anvil projection (FIGS. 22 and 23). The anvil 218 is formed with a hole 258 interrupting the anvil face 255 and of the same diameter as the tongue hole 36, and a pilot pin 259 fixed to the jaw 224 has a tapered nose 260 adapted to be received in the tongue hole and project into the anvil hole, as will appear.

The tool 220 is preferably of a type adapted to be held in and controlled by one hand of the operator and, for this purpose, has a handle 261 and a trigger control 262. The handle 261 is formed with a compressed air inlet 264 threaded at its outer end 266 for the reception of the outlet of a compressed air unit (not shown), and has a cylindrical bore 268 in which a slide valve 270 is reciprocable but not rotatable. The valve 270 may comprise a sleeve 272 and a rod 274 fixed thereto, said rod having at its inner end a round nose 276 biased by a spring 278 into engagement with the inclined cam surface 280 of the trigger 262. The handle 261 has an inlet port 282 between the compressed air inlet passage 264 and the cylindrical bore 268. The slide valve sleeve 272 has ports 284, 286, 288 and 290, and the slide valve rod 274 has a circumferential groove 292 communicating with the several sleeve ports. The handle 261 has a passage 294 with a port 296 leading therefrom to the cylinder bore 268, said passage leading to the open upper port 298 of the cylinder 202. The handle 261 is further formed with an exhaust hole 300 leading to the atmosphere.

The tool 200 is adapted to operate on a pair of plates 30 and 32 preliminarily assembled as shown in FIG. 2. With the trigger 262 relaxed (FIG. 20), the operator lowers the tool 200 over the plates 30 and 32 so that the tongue 34 is received through the opening 304 in the bottom 306 of the alcove 216 and between the anvil projection 254 and the jaw 224, with the intermediate portion 50 of the tongue in engagement with the anvil face 255 and the marginal portions 48 of the tongue extending laterally beyond the side edges 308 of said face, with the top 68 of the tongue somewhat below the rounded jaw projection 222, and with the upper end 106 of the tongue hole 36 slightly below the upper side of the anvil hole 258, the tongue hole thus being slightly out of register with the anvil hole, with the plate 32 engaging the bottom 310 of the anvil 218 and the plate 30 spaced below the plate 32 as in FIG. 2.

With the trigger 262 in its inoperative position as shown in FIG. 20, a finger of the hand of the operator holding the handle 261 pulls the trigger upward, causing the same, by reason of engagement of its cam surface 280 with the valve nose 276 to move the valve 270 in the direction to compress the spring 278 to an extent to block the exhaust hole 300 and locate the valve ports 284 and 290 in substantial register with the inlet and outlet ports 282 and 296, respectively, so that compressed air from the inlet passage 264 passes through the port openings 282, 284, the valve groove 292, the openings 290 and 296, the passage 294 and the cylinder hole 298 to thereby enter the cylinder 202 and force the pitson 204 downward, causing its surface 312 to engage the head 232 of the plunger 230 and force the same down to the position occupied in FIGS. 21 and 22.

In this movement of the plunger 230, its protuberance 252 engages the cam surface 228 of the die jaw 224 and thus rotates the jaw into the position occupied in FIGS. 21 and 22. As the jaw 224 swings toward the anvil 218, the tapered nose of the pilot pin 260 engages the top 106 of the tongue hole 36 and nudges the tongue 34 upward, thus raising the plate 30, until the plate is in tight flatwise engagement with the plate 32. As the operative swing of the jaw 224 continues, the deforming sides 257 of the jaw engage and bend the tongue margins 48 progressively downward about the side edges 308 of the anvil face 255, the deformation of the bases or bottoms of said margins being accompanied by a shearing of the margin bottoms, forming locking tabs 312 securely on the opposite sides of the longitudinal median of tongue 34 for interlocking the plates 30 and 32 as shown in FIGS. 22 and 23. The deforming operation is practically instantaneous.

Upon the operator's release of the trigger 262, the spring 278 expands and causes the valve nose 276 to cam the trigger downward to the position shown in FIG. 20, where the trigger is stopped by suitable means (not shown), the valve 270 thus moving to a position in which it prevents access of air from the inlet port 282 to the handle passage 296, and in which the valve opening 288 substantially registers with the handle port 296, and the valve exhaust port 286 substantially registers with the handle exhaust hole 300, whereupon the air in the cylinder 202 above the piston 204 escapes by passing through the cylinder hole 298, the handle passage 294, the ports 296 and 288, the groove 292; and the exhaust holes 286 and 300, to the atmosphere, the piston being meanwhile raised to its initial position by the spring 314, preparatory to the next deforming operation.

By use of the same tool employing, however, an anvil 320 and jaw 322 having the form shown in FIGS. 24 to 26, the tongue 24 may be deformed to the shape shown in FIGS. 26 and 27.

The anvil 320 has a pilot receiving hole 324 which at the bottom of its inner end is interrupted by a vertical groove 326 whose side walls 328 are tangent to the sides of the hole. The jaw 322 has a pilot pin 330 below which the jaw is formed with a V-projection 332, the tapered nose 334 of the pin projecting beyond the projection. The top 106 of the tongue hole 36 is spaced slightly below the top 336 of the anvil hole 324 a distance equal to the distance between the plates 30 and 32 in their preliminary assembly, and the pilot pin 330 is so located that, when the jaw 322 is swung to its final position, the pin is coaxial with the anvil hole. Thus, as the pilot pin 330 enters the tongue hole 36, the nose 334 of the pin engages the upper part 106 of said tongue hole and cams the tongue 34 upward a distance sufficient to bring the plates 30 and 32 into tight flatwise interengagement. The bottom of the V-projection 332 of the jaw 322 is arranged to move tangentially relative to the plate 32, and the projection is arranged so that its apex 336 will engage the full length of the intermediate portion 50 of the tongue centrally from the bottom of the tongue hole 36 to the upper surface of the plate 32. Thus, as the jaw 322 continues its rocking movement, the projection 332 shears the tongue portion 50 centrally from the tongue hole 36 to the plate 32 and also shears the same tongue portion at the opposite sides of the apex 336 to form adjacent wings or tabs 338 which tightly engage the plate 32, producing a plate-locking tongue formation shown in FIGS. 26 and 27.

Referring now to the hand tool shown in FIGS. 28–34, inclusive, this tool comprises a tubular sleeve member 400 having a handle 402 integral therewith and also having a tubular liner 405 retained in any suitable manner as by set screws 407.

Longitudinally slideable and rotatable within the members 400 and 405 is a rod 410, a free extremity of this rod being diametrically grooved as at 412. As seen best in FIGS. 28 and 29, the outer end portion 415 of liner 405 is reduced on the inside to provide an annular space 418 between the rod 410 and liner 405. A bevel 420 is provided at the outer extremity of said reduced portion 415 of the liner 405, as seen clearly in FIGS. 29–31 and 33.

Figures 30, 31:
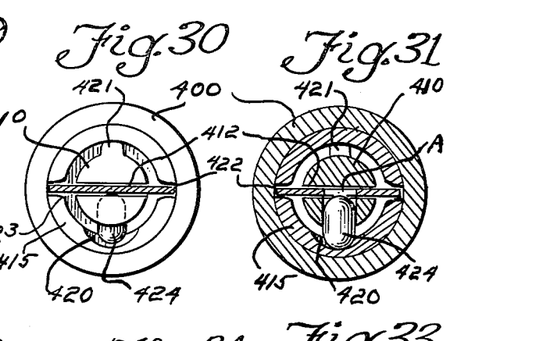
FIGS. 30 and 31 are sectional views taken substantially along the lines 30—30 and 31—31, respectively, of FIG. 28.
Figures 32, 33, 34:
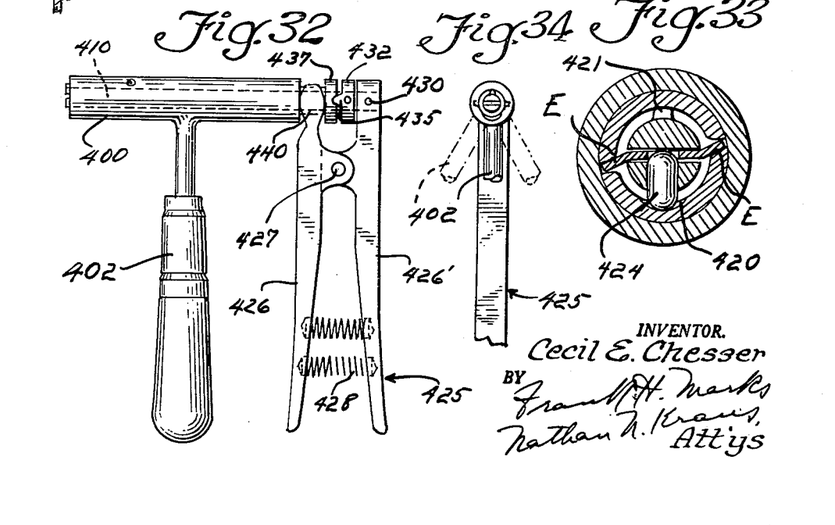
FIG. 32 is a plan view of the tool shown in FIGS. 28–31.
FIG. 33 is a sectional view taken substantially along the line 33—33 of FIG. 29.
FIG. 34 is a fragmentary end elevational view of the tool shown in FIG. 32.

As seen in FIGS. 30, 31 and 33, the reduced portion 415 of the liner 405 is diametrically slotted at the end thereof, as at 422, the inner corners of said slots being bevelled as seen at 423.

A detent 424 is seated in a correspondingly shaped aperture formed near the free extremity of rod 410, said detent being more or less cylindrical in shape with rounded ends, the outer extremity of said detent normally bearing against the bevelled surface 420, which serves to cam the detent through its aperture in the rod. The rod 410 also has an integral longitudinal rib 421 extending across the space 418 so as to bear against the inner surface of the liner 405.

Arranged on the opposite end of rod 410 is a manipulating handle indicated generally by the numeral 425, comprising a pair of levers 426, 426' pivoted together as at 427, one or more compression springs 428 being interposed between said levers. The lever 426' is fixed to the rod 410 as at 430. Also secured to said rod adjacent the lever 426' is a disk 432 having diametrical bosses 435 on opposite sides of rod 410 which seat in grooves formed in another plate 437 which may be integral with sleeve 400. It will be noted that the cooperative relation of the bosses 435 and grooves formed in plate 437 serve to locate the groove 412 of rod 410 in alignment with the slots 422 of liner 405.

Lever 426 of the handle 425 has a bifurcated anvil portion 440 which is rounded on both sides thereof, substantially occupying the space between plate portion 437 and the end of the tubular member 400 against which said anvil 440 bears.

The operation of this tool is as follows. Assuming that plates P and P' are to be secured together, the plate P will be provided with a slot S to receive a tongue T which is punched out of the plate P', said tongue T having an aperture A formed therein of such size as to receive the rounded end of detent 424 but being of smaller diameter than the maximum diameter of said detent.

Figure 28:
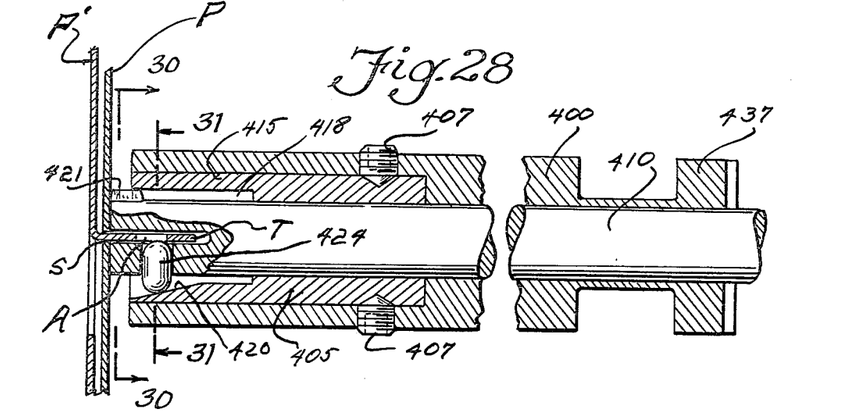
FIG. 28 is a fragmentary sectional view of another embodiment of hand tool embodying my invention, shown in operative relation to the pair of plates upon which said tool is working, in the first stage of the operation.
Figure 29:
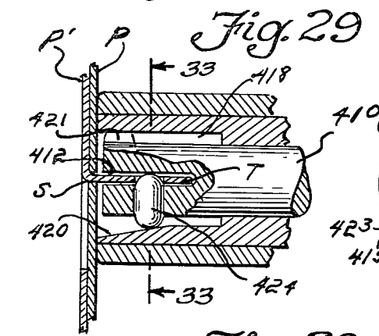
FIG. 29 is a fragmentary view similar to FIG. 28, at a subsequent stage of the operation.

In the first step of the operation, with the handles 402 and 425 of the tool in parallel relation (FIG. 32) and with the slots 412 and 422 in alignment, as seen in FIGS. 30 and 31, the tool is brought into engagement with the work in such manner that the tongue T of plate P' extends into the aforesaid slots 412 and 422. It will be seen that in this position the rod 410 extends slightly beyond the extremity of tubular members 400 and 405, as seen in FIG. 28. The operator then presses together levers 426 and 426' and simultaneously presses the tool against the work, whereupon the parts will assume a relationship as seen in FIG. 29. It should be noted that when this position is assumed the detent 424 will be cammed by the bevelled surface 420 of the tool into the aperture A of tongue T of the plate, thus effectively locking the tool to said tongue and drawing the plates together.

In the next operation tubular part 400 is given a slight rotation, say approximately 45° or less, by means of handle 402 and the tool is then withdrawn from the work.

As seen best in FIG. 33 the result of this operation is the formation on opposite sides of tab T of ears E which, by projecting angularly from the slot S of plate P, serve to lock the two plates firmly together.

Various changes coming within the spirit of my invention may suggest themselves to those skilled in the art. Hence I do not wish to be limited to the specific embodiments described or uses mentioned, but intend the same to be merely exemplary, the scope of my invention being limited only by the appended claims.

The invention claimed is:

1. A tool for securely coupling a pair of sheet metal plates in flatwise interengagement, one plate having a narrow opening, the second plate having a planar struck-up tongue extending through the opening and also having a hole in the intermediate part thereof spaced from the first plate, said device comprising a cylindrical rod with a diametral end kerf adapted to receive the intermediate portion of the tongue, a pin mounted in said rod, a spring-pressed manually releasable pawl pivotally mounted on said pin and having a tooth adjacent said slot, said tooth being disposed within the confines of said rod and biased transversely toward said kerf and engageable in the hole in the tongue when the tongue is in the said kerf, a sleeve telescoped about said rod and having a double-branched slot into which said pin projects, one branch of said slot extending circumferentially and the other branch extending helically from the open end of said circumferential branch toward the kerfed end of said rod, said branches extending at an obtuse angle to each other, said sleeve having diametrically opposite end notches substantially wider than and communicating with said kerf, said pin projecting into the closed end of said helical branch when the intermediate part of the tongue is receivable in said kerf and the marginal parts of the tongue are receivable in said notches, whereby, when relative rotation takes place between said rod and said sleeve, said pin and helical branch cooperate cam-wise to effect relative axial movement between said rod and sleeve, to the end that said tooth pulls the tongue and said sleeve thrusts the first plate into tight flatwise engagement with the second plate, said pin being located at the open end of said circumferential branch and a side of one notch is disposed adjacent one longitudinal edge of the tongue at one face of the tongue and a side of the other notch is disposed adjacent the other longitudinal edge of the tongue at the other face of the tongue when such plate interengagement occurs, so that, as the relative rotation between said rod and sleeve continues, said pin and circumferential branch cooperate to confine said rod and sleeve to relative rotation and said notch sides shear the longitudinal margins of the tongue in the plane of the adjacent face of the first plate and at the same time bend said margins about the longitudinal edges of said kerf, imparting to the tongue a transverse Z-shape, the sheared edges of the margins then engaging the first plate and thus securely interlocking the plates, said pawl having a portion manually movable to withdraw said tooth from the tongue hole to enable the deformed tongue to be withdrawn from said device, said rod and sleeve being relatively rotatable in the direction opposite to that above set forth to separate said notch sides from the tongue and thereby facilitate withdrawal of the tongue.

2. A hand tool of the class described comprising a cylindrical member, a rod rotatable and longitudinally slideable relative to said member, the corresponding end of said member and of said rod being diametrically grooved for receiving a sheet metal piece edgewise, and means for axially shifting said member and rod a slight distance relative to each other and for effecting relative rotation.

3. A tool of the class described, comprising an inner member having a cylindrical end portion with a diametral kerf, an outer member telescoped about said end and having diametrically opposite longitudinally extending notches adjacent and adapted to communicate with said kerf, each notch having a flat side, said sides facing in the same direction circumferentially and lying in parallel planes equidistant from the axis of said inner member, outer portions of said sides lying in a diametral plane containing said axis, said members being relatively rotatable to enable said plane to incline relative to and cross the plane of said kerf.

4. A tool of the class described, comprising an inner member having a cylindrical end portion with a diametral kerf, an outer member telescoped about said end and having diametrically opposite longitudinally extending notches adjacent and adapted to communicate with said kerf, each notch having a flat side, said sides facing in the same direction circumferentially and lying in parallel planes equidistant from the axis of said inner member, outer portions of said sides lying in a diametral plane containing said axis, said members being relatively rotatable to enable said plane to incline relative to and across the plane of said kerf, and releasable means cooperating with said inner member and projectable transversely into said kerf for locking therein a piece of sheet metal, opposite portions of which beyond said kerf, are to be bent by said sides.

5. A device of the class described, comprising an inner member having a cylindrical end portion with a diametral kerf, an outer member telescoped about said end having a notch with a non-radial flat side extending parallel to the axis of and terminating inwardly at the bore of said outer member, said outer member being rotatable relative to said inner member to move said side to a position at which said side forms an angle with said kerf.

6. A device of the class described, comprising a member having a kerf therethrough adapted to receive the intermediate portion of a planar piece of sheet metal whose protruding end portions are to be bent about said member at the side edges of said kerf, bending means operatively connected with said member and having opposite flat faces equally related to said kerf and adapted to be equally inclined to the sheet metal piece when the piece is arranged as aforesaid, and means for moving said faces simultaneously toward said plane to enable said faces to bend the protruding ends of the sheet metal piece at the side edges of the kerf.

7. A tool of the class described, comprising an inner member having a cylindrical end formed with a kerf containing the axis thereof, an outer member telescoped about said end and having opposite parallel faces equally related to said kerf, one face being disposed at one side of the plane of said kerf in proximity to a longitudinal edge of said kerf when the other face is disposed at the opposite side of said plane in proximity to the other longitudinal edge of said kerf, and means for relatively rotating said members throughout a distance such that said faces form angles with the plane of said kerf at the edges of said kerf.

8. A tool of the class described, comprising an inner member having a cylindrical end formed with a kerf containing the axis thereof, an outer member telescoped about said end and having opposite parallel faces equally related to said kerf, one face being disposed at one side of the plane of said kerf in proximity to a longitudinal edge of said kerf when the other face is disposed at the opposite side of said plane in proximity to the other longitudinal edge of said kerf, and means for relatively rotating said members throughout a distance such that said faces form angles with the plane of said kerf at the edges of said kerf, said faces terminating at an end surface of said outer member and defining therewith shearing edges normal to said axis.

9. A tool of the class described, comprising an inner member having a cylindrical end formed with a kerf containing the axis thereof, an outer member telescoped about said end and having opposite parallel faces equally related to said kerf, one face being disposed at one side of the plane of said kerf in proximity to a longitudinal edge of said kerf when the other face is disposed at the opposite side of said plane in proximity to the other longitudinal edge of said kerf, means for relatively rotating said members throughout a distance such that said faces form angles with the plane of said kerf at the longitudinal edges of said kerf, and releasable means mounted on said inner member and engageable in said kerf for locking a piece of sheet metal therein.

10. A tool of the class described, comprising an inner member having a cylindrical end formed with a kerf containing the axis thereof, an outer member telescoped about said end and having opposite parallel faces equally related to said kerf, one face being disposed at one side of the plane of said kerf in proximity to a longitudinal edge of said kerf when the other face is disposed at the opposite side of said plane in proximity to the other longitudinal edge of said kerf, and means for relatively rotating said members throughout a distance such that said faces form angles with the plane of said kerf at the respective edges of said kerf, said faces terminating at the end surface of said outer member in shearing edges normal to said axis, means operative when said faces are respectively spaced from said plane and pursuant to force tending to effect predetermined relative rotation of said members for subjecting said members to combined relative rotation and axial translation until said faces substantially touch said plane, and means operative pursuant to continuation of said force for confining said members to relative rotation.

11. A tool of the class described, comprising an inner member formed with a kerf, an outer member telescoped about said inner member and having opposite faces equally related to said kerf, means for relatively moving said members throughout a distance such that said faces form angles with the plane of said kerf at the respective opposite edges of said kerf, and means for locking the intermediate portion of a sheet metal plate in said kerf during such relative movement.

12. A tool of the class described comprising a cylinder, a piston in said cylinder, a sleeve fixed to and extending from said piston parallel to the cylinder axis toward an end of said cylinder and having an external projection spaced from said piston, a rod fixed at one end to said cylinder end and telescopically received in said sleeve, a plunger extending in said cylinder and having a portion telescoped with said sleeve between said projection and said piston and capable of movement selectively by said piston and projection lengthwise of said sleeve, an alcove connected to said cylinder adjacent said end thereof, a die anvil fixed in said alcove, a pivoted die jaw complemental to said anvil, said alcove having an opening to admit a piece of sheet metal to a position between said anvil and said jaw, said jaw having a surface facing away from said anvil and facing a wall of said alcove, said surface comprising a first portion inclined toward said alcove wall and the other end of said cylinder and a second portion inclined toward said alcove wall and away from said cylinder, said alcove wall extending parallel to said axis, said plunger having a free end projecting into said alcove, one side of said free end being slidable along said alcove wall and the opposite side of said free end being in the form of a rounded protuberance projecting into engagement with said jaw surface, said protuberance being movable by said piston during the final portion of the working stroke of said piston into engagement with the second incline portion of said jaw surface to swing said jaw toward said anvil, said protuberance being movable by said sleeve projection against the other inclined portion of said jaw surface during the final portion of the return stroke of said piston to swing said jaw away from said anvil, and means operative at will for reciprocating said piston.

13. A tool of the class described comprising a cylinder, a piston in said cylinder, a sleeve fixed to and extending from said piston parallel to the cylinder axis toward an end of said cylinder, said sleeve having an external projection spaced from said piston, a plunger extending in said cylinder and having a boss movable along said sleeve between said projection and said piston, an alcove connected to said cylinder end, a die anvil fixed in said alcove, a die jaw movable relative to and complemental to said anvil, said alcove having an opening to admit a piece of sheet metal to a position between said anvil and said jaw, said jaw having a pair of inclined cam surfaces said plunger having a cam portion adjacent said cam surfaces, said cam portion being engageable with one of said cam surfaces during the final portion of the working stroke of said piston to cam said jaw toward said anvil, and with the other cam surface during the final portion of the return stroke of said piston to cam said jaw away from said anvil, and means operative at will for reciprocating said piston, and means on said jaw engageable with the inner surface of a hole in the piece of sheet metal to cam the piece further inward immediately before commencement of the die operation thereon.

14. A tool of the class described comprising a cylinder, a piston therein, a die anvil fixed to said cylinder, a cooperating die jaw adjacent said anvil, means responsive to movement of said piston in its working stroke to move said jaw toward said anvil and responsive to movement of said piston in its return stroke for withdrawing said jaw from said anvil, means for reciprocating said piston, and means on said jaw for engaging a portion of a sheet metal workpiece inserted between said anvil and jaw for drawing the workpiece more deeply into the space between said anvil and jaw as said jaw approaches said anvil.

15. A tool for locking in tight flatwise interengagement a pair of plates, one of which has a slot and the other a right angularly offset perforated tongue projecting through the slot, said tool comprising a member having an opening for the reception of the tongue, means including a projection engageable in the hole in the tongue when the tongue is in said opening to retain the tongue in said member, means for moving said projection in a direction to force the slotted plate into tight engagement with said member at the mouth of said opening, and means for bending and shearing a portion of the tongue at the juncture of said portion with the slotted plate so that the sheared edge of said portion tightly engages the adjacent surface of the slotted plate.

References Cited in the file of this patent
UNITED STATES PATENTS

| | | |
|---|---|---|
| 1,450,961 | Otterbein | Apr. 10, 1923 |
| 1,580,278 | Bartels | Apr. 13, 1926 |
| 2,365,787 | Wallace | Apr. 7, 1941 |
| 2,424,024 | Garton | July 15, 1947 |
| 2,432,804 | Rieske | Dec. 17, 1947 |
| 2,436,806 | Hunt | Mar. 2, 1948 |
| 2,722,625 | Bingeman et al. | Nov. 1, 1955 |
| 2,800,960 | Cutler | July 30, 1957 |
| 2,800,961 | Cutler | July 30, 1957 |
| 2,900,714 | Watkins | Aug. 25, 1959 |